Aug. 18, 1936.  W. C. HEDGCOCK  2,051,600
TRUCK
Filed May 11, 1934  3 Sheets-Sheet 2
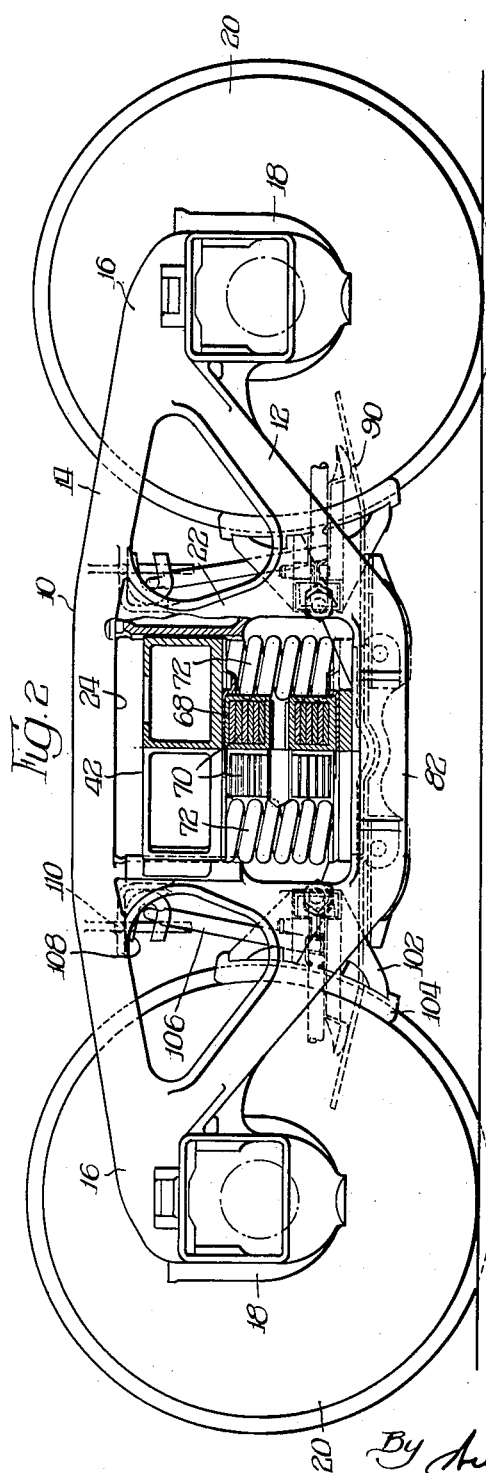
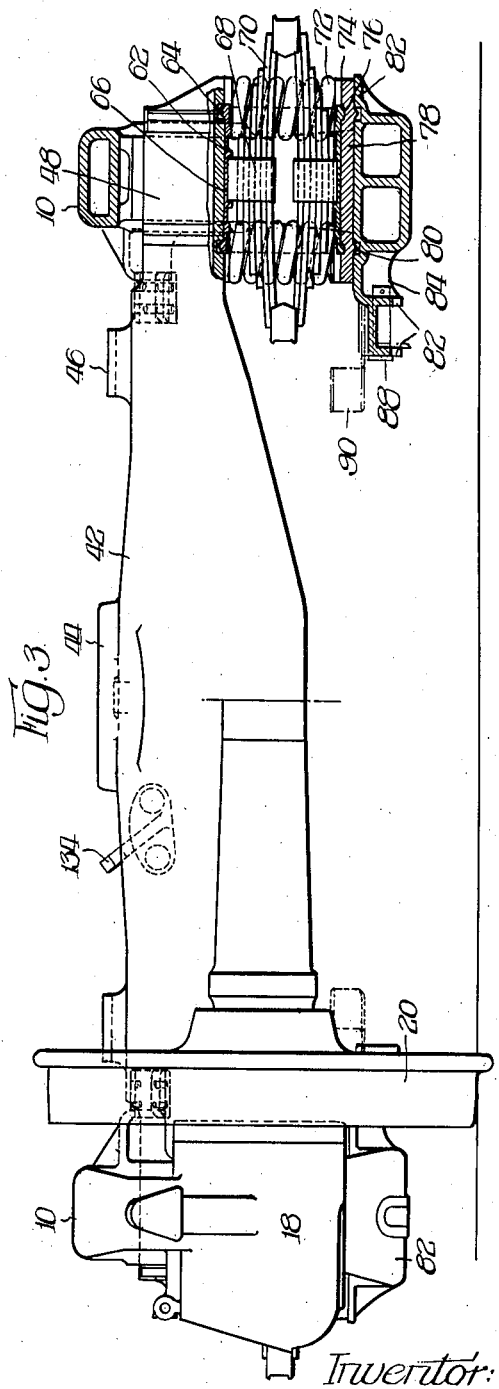
Inventor:
William C. Hedgcock
By Atchison, Hurley, Byron & Knight
Attys.

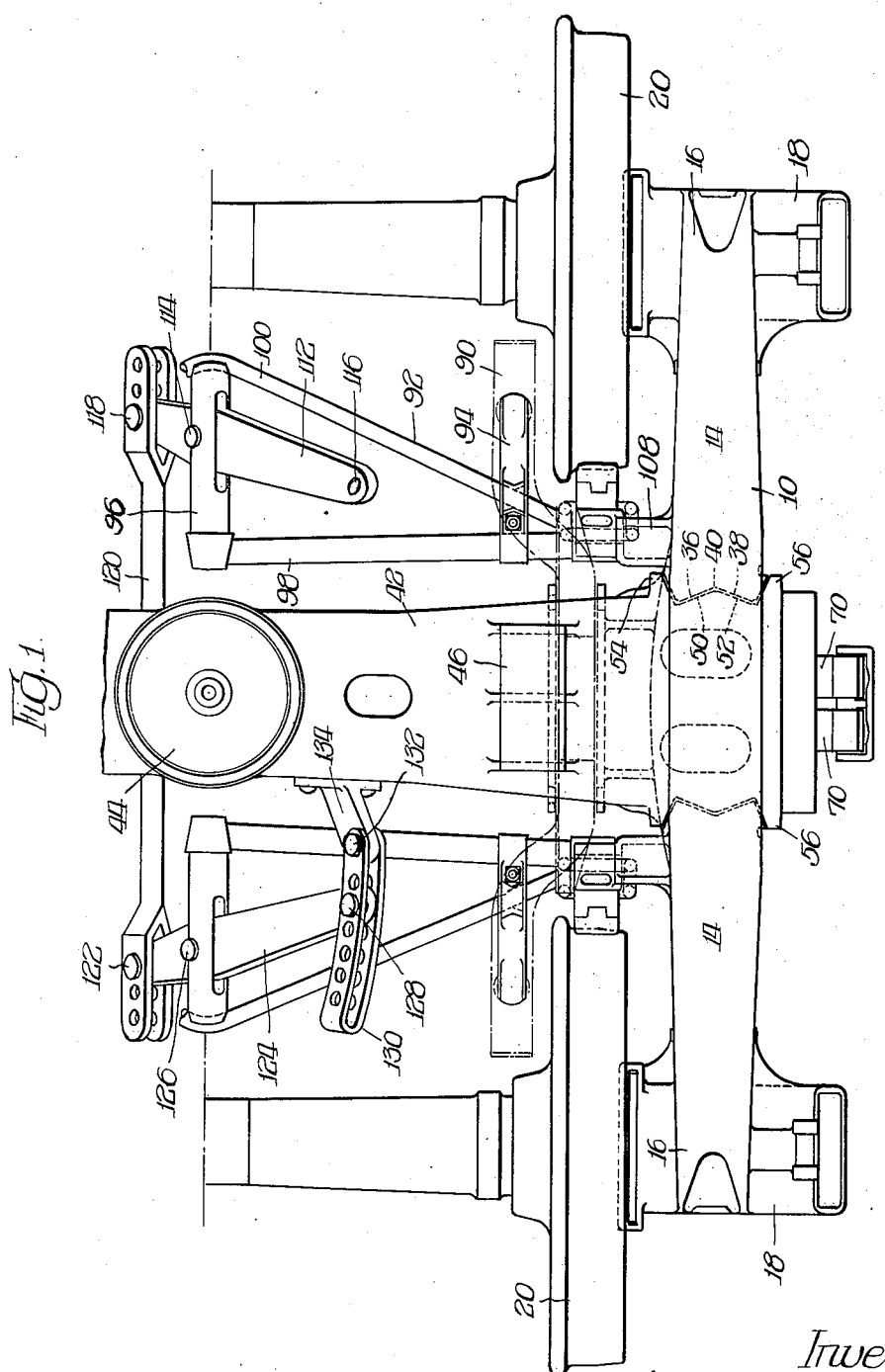

Aug. 18, 1936.  W. C. HEDGCOCK  2,051,600
TRUCK
Filed May 11, 1934   3 Sheets-Sheet 3

Inventor
William C. Hedgcock,

Patented Aug. 18, 1936

2,051,600

UNITED STATES PATENT OFFICE 2,051,600

TRUCK

William C. Hedgcock, Wilmette, Ill., assignor to American Steel Foundries, Chicago, Ill., a corporation of New Jersey Application May 11, 1934, Serial No. 725,069

19 Claims. (Cl. 105—197.1)

This invention pertains to car trucks.

An object of the invention is to provide a car truck wherein a load carrying member is provided maintaining the truck in squared relation.

Still another object is to provide a truck construction wherein a load carrying member is provided, said member and the side frames being provided with guide cooperating surfaces of increased capacity for maintaining the truck in squared relation, the cooperating surfaces of the columns being such as to provide adequate bearing surface regardless of angular movement between the side frames and the load carrying member.

A further object is to provide a truck construction wherein a load carrying member is provided cooperating with the side frames, the guide cooperating surfaces between the load carrying member and side frames being arranged to prevent crimping action which would occur between conventional guide cooperating surfaces when the truck is negotiating a curve.

Yet a further object is to provide a truck construction of the spring-plankless type wherein supporting means is provided on the side frame for a brake rigging fourth point support or safety support.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a truck construction embodying the invention;

Figure 2 is a side elevation partly in section of the truck construction illustrated in Figure 1;

Figure 3 is an end elevation partly in section of the truck construction illustrated in Figures 1 and 2;

Figure 4:
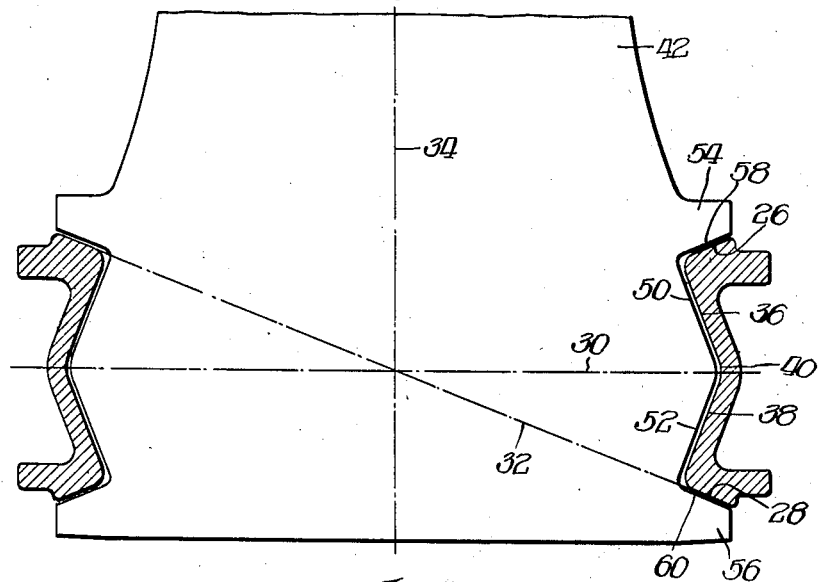
Figure 4 is an enlarged sectional plan view showing normal cooperation between the bolster and the column guides of the truck construction shown in Figures 1 to 3 inclusive.

In the truck construction illustrated, the side frame 10 is of the so-called double truss construction, including the tension member 12, the compression member 14 merging adjacent the ends thereof as at 16 and being provided with the journal boxes 18 having cooperative relation with the journal ends of the wheel and axle assemblies 20. The side frame 10 is provided with the spaced integral connecting column guides 22 connecting the tension and compression members and forming the window 24 therewith.

The truck construction illustrated is a spring-plankless four-wheel truck, and in order to provide the maximum bearing area between the column guides and the columns provided on the bolster associated therewith, the columns are preferably constructed with the inner and outer faces 26 and 28, said faces sloping toward the longitudinal center line 30 of the side frames, the inner and outer faces of the opposite column guides being disposed in vertical planes 32 passing through the intersection of the longitudinal center line 30 of the side frame and the longitudinal center line 34 of the bolster. The column guides between the inner and outer surfaces 26 and 28 are substantially of V-shape having the inner and outer guide portions 36 and 38, the apex 40 thereof being substantially on the longitudinal center line of the side frame. Thus the columns are generally of W-shape, providing increased bearing surfaces over conventional column structure, and adequate bearing area under all operating conditions.

The bolster 42 is shown substantially of box-section and is provided with the center bearing 44 and the side bearings 46, said bolster extending into the window 24 and being provided with the column guide cooperating portions 48 of complementary shape to that of said column guides whereby guide portions 50 and 52 cooperate respectively with the portions 36 and 38. The internal and external lugs 54 and 56 provide the surfaces 58 and 60 having sliding cooperation with the surfaces 26 and 28.

Figure 5:
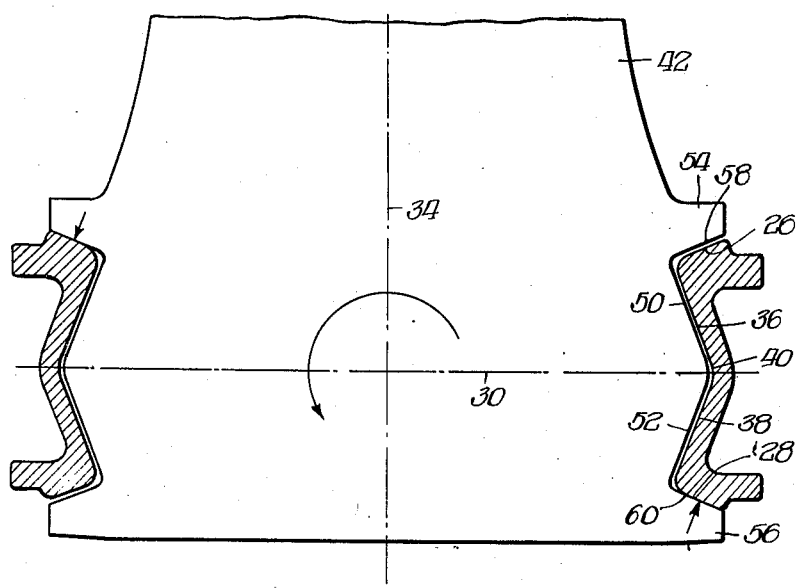
Figure 5 is a sectional plan corresponding to Figure 4 showing the position of the cooperating surfaces when the side frame is thrust out of square with respect to the bolster.

By a reference to Figures 4 and 5, the nature of the operation of the cooperating surfaces of the column guides and column cooperating surfaces is shown. When twisting occurs between the bolster and side frame, as shown by the arrow in Figure 5, as this is a spring-plankless truck, the square relation must be maintained by the bolster. Thus it will be seen by a reference to Figure 5 that this is readily accomplished as large bearing surfaces between the column guides and the column cooperating surfaces are provided as a protection against wear; these surfaces, due to the disposition of the parts of the column guides and column cooperating surfaces, being much larger than those on the ordinary truck.

The bolster in the window is provided with the spring cap or spring plate 62 maintained in position with respect to the bolster by means of the dowel 64 receivable in suitable apertures in the bolster tension member. The spring plate is provided with the spring positioning means 66 for the reception of the upper spring band 68 of the leaf spring 70, the spring plate also being provided with seats for the coil springs 72 of the spring group. As shown, the leaf springs are intermediate the spaced coil springs, though an opposite arrangement may be used. A lower spring plate 74 is likewise provided similar to the upper spring plate, being positioned by reception of the depending dowels 76 in the spring seat member 78 positioned by means of the reception of the dowels 80 in the spring seat 82 of the tension member 12 provided between the columns 22.

The tension member between the columns is provided with the inwardly extending bracket 84, said bracket being provided with the spaced depending flanges 86 for the reception of securing means 88 for the brake beam safety means 90. The brake beam safety means extends longitudinally of the truck and underlies the brake beams 92. As shown, the brake beams 92 are provided with the shoes 94 disposed in substantially vertical alignment with the brake beam safety means and slidably cooperating therewith whereby a fourth point support is provided.

The brake beams 92 are of truss construction and each includes the fulcrum 96 interposed between the members 98 and 100, the ends of said brake beams being provided with the brake heads 102 having suitable shoes 104 thereon for braking cooperation with the rims of the wheels of the wheel and axle assembly 20. The brake heads are swingably connected by means of the brake hangers 106 to the brake hanger brackets 108 provided on the side frame adjacent the column, securing means 110 maintaining the brake hangers in cooperative relation with said brackets.

A portion of the brake operating means is illustrated, the brake beam fulcrum 96 at the right of Figure 1 being shown as provided with the brake lever 112 pivoted intermediate the ends thereof as at 114 to the fulcrum 96, the upper end 116 of said brake beam being adapted to be operated toward the right to apply the brake shoes to the wheels. The lower end of the brake lever is pivotally connected as at 118 to the push rod 120, the other end of said push rod being adjustably connected as at 122 to the lower end of the brake lever 124 cooperating with the fulcrum 96 at the left of the figure, the lever being pivoted thereto as at 126 intermediate the ends of said lever. The upper end of said brake lever is adjustably pivoted as at 128 to the strap 130 pivotally connected as at 132 to the bracket 134 provided on the bolster.

With a truck of this character easy riding qualities are provided, with a great saving in weight due to the elimination of the spring plank. The disposition of the metal in the column guides and the column cooperating portions of the load carrying member is such as to maintain the truck in squared relation with a minimum of wear, and a desirable fourth point support for the brake rigging is readily obtained.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A side frame having spaced guide columns, said columns having oppositely arranged diverging guiding portions, the inner of the guiding portions of one of said columns being aligned with the outer of the guiding portions of the other of said columns, said columns having substantially a V-shaped guiding portion between said inner and outer guiding portions.

2. A side frame having spaced guide columns, said columns having oppositely arranged diverging guiding portions, opposite portions of opposite columns being arranged substantially in a common plane, said columns having substantially a V-shaped guiding portion between said first named guiding portions.

3. In a side frame, the combination of tension and compression members and integrally formed spaced guide columns forming a window, said columns having guiding portions in said window diverging outwardly thereof, the inner of the guiding portions of one of said columns being aligned with the outer of the guiding portions of the other of said columns, said columns having substantially a V-shaped guiding portion between said inner and outer guiding portions.

4. A bolster having diverging column guide cooperating portions, opposite faces of opposite portions being disposed in substantially a common plane, the portions between said first named portions being substantially V-shaped.

5. A bolster having diverging column guide cooperating portions, opposite faces of opposite portions being disposed in substantially a common plane, the portions between said first named portions being substantially externally V-shaped.

6. A bolster having diverging column guide cooperating portions, opposite faces of opposite portions being disposed in substantially a common plane, the planes of said portions intersecting substantially on the longitudinal center line of said bolster, the portions between said first named portions being substantially V-shaped.

7. A bolster having diverging column guide cooperating portions, opposite faces of opposite portions being disposed in substantially a common plane, the planes of said portions intersecting substantially on the longitudinal center line of said bolster, the portions between said first named portions being substantially externally V-shaped.

8. In a spring-plankless truck, the combination of spaced side frames each including tension and compression members and spaced columns integrally connecting said members and forming a window, a load carrying member serving as the sole connection between said side frames, said load carrying member extending into each window and having portions having sliding cooperation with angularly disposed surfaces provided on said columns, the inner surfaces of the columns of each of said side frames being co-planar with the outer surfaces of the other of the columns for a portion of the length thereof, the cooperating surfaces between said angularly disposed surfaces having a portion angularly disposed with respect to the longitudinal center line of the side frames, the angle formed bring other than 90°.

9. In a spring-plankless truck, the combination of spaced side frames each including tension and compression members and spaced columns integrally connecting said members and forming a window, a load carrying member serving as the sole connection between said side frames, said load carrying member extending into each window and having portions having sliding cooperation with angularly disposed surfaces provided on said columns, the inner surfaces of the columns of each of said side frames being coplanar with the outer surfaces of the other of the columns for a portion of the length thereof, the cooperating surfaces between said angularly disposed surfaces being substantially V-shaped.

10. In a spring-plankless truck, the combination of spaced side frames each including tension and compression members and spaced columns integrally connecting said members and forming a window, a load carrying member serving as the sole connection between said side frames, said load carrying member extending into each window and having portions having sliding cooperation with angularly disposed surfaces provided on said columns, the inner surfaces of the columns of each of said side frames being co-planar with the outer surfaces of the other of the columns for a portion of the length thereof, the cooperating surfaces between said angularly disposed surfaces being substantially V-shaped, the apices thereof being toward the adjacent ends of said truck.

11. A side frame having spaced guide columns, said columns having oppositely arranged diverging guiding portions, the inner of the guiding portions of one of said columns being aligned with the outer of the guiding portions of the other of said columns, the cooperating surfaces between said angularly disposed surfaces having a portion angularly disposed with respect to the longitudinal center line of the side frame, the angle formed being other than 90°.

12. A side frame having spaced guide columns, said columns having oppositely arranged diverging guiding portions, the inner of the guiding portions of one of said columns being aligned with the outer of the guiding portions of the other of said columns, the intermediate surfaces between said angularly disposed surfaces being substantially V-shaped.

13. A side frame having spaced guide columns, said columns having oppositely arranged diverging guiding portions, the inner of the guiding portions of one of said columns being aligned with the outer of the guiding portions of the other of said columns, the intermediate surfaces between said angularly disposed surfaces being substantially V-shaped, the apices thereof being toward the adjacent ends of said truck.

14. A side frame having spaced columns, said columns having oppositely arranged diverging guiding portions having a free edge, the inner of the guiding portions of one of said columns being aligned with the outer of the guiding portions of the other of said columns, said columns having substantially a V-shaped guiding portion between said inner and outer guiding portions, the apex of the V extending in the same direction as the free edge of said guiding portions.

15. A side frame having spaced guide columns, said columns having oppositely arranged diverging guiding portions having a free edge opposite portions of opposite columns being arranged substantially in a common plane, said columns having substantially a V-shaped guiding portion between said first named guiding portions, the apex of the V extending in the same direction as the free edge of said guiding portions.

16. In a side frame, the combination of tension and compression members and integrally formed spaced guide columns forming a window, said columns having guiding portions in said window diverging outwardly thereof and having a free edge, the inner of the guiding portions of one of said columns being aligned with the outer of the guiding portions of the other of said columns, said columns having substantially a V-shaped guiding portion between said inner and outer guiding portions, the apex of the V extending in the same direction as the free edge of said guiding portions.

17. A side frame having spaced columns, said columns having spaced flanges, and portions intermediate said flanges, said portions and said flanges being so disposed as to provide substantially W-shaped columns, the intermediate apex of said columns extending toward the adjacent end of the side frame.

18. A load carrying member including an elongated body portion having column cooperating portions, each of said portions presenting a substantially W-shaped cooperating surface for engaging associated columns, the intermediate apex of said portions pointing away from the longitudinal center line of said body portion.

19. A side frame having spaced columns, said columns having spaced flanges, portions between said flanges being angularly disposed and extending out of the transverse plane connecting the inner edges of said flanges and in a direction toward the adjacent end of the side frame.

WILLIAM C. HEDGCOCK.